United States Patent [19]

Mathur

[11] Patent Number: 5,809,689

[45] Date of Patent: Sep. 22, 1998

[54] TREE TRUNK SHIELDING DEVICE

[76] Inventor: Shashi R. Mathur, 4838 Rhea Rd., Witchita Falls, Tex. 76308

[21] Appl. No.: 872,924

[22] Filed: Jun. 11, 1997

[51] Int. Cl.$^6$ ............................ A01G 13/10; A01G 17/00
[52] U.S. Cl. ...................................... 47/23; 47/30
[58] Field of Search .................... 47/23, 30, 26, 47/21

[56] References Cited

U.S. PATENT DOCUMENTS

| | | | |
|---|---|---|---|
| 223,093 | 12/1879 | Barnhill et al. | 47/23 |
| 5,016,388 | 5/1991 | Burress et al. | 47/23 |
| 5,060,416 | 10/1991 | Rohde | 47/23 |
| 5,263,278 | 11/1993 | Valenti, Jr. | 47/30 |

FOREIGN PATENT DOCUMENTS

| | | | |
|---|---|---|---|
| 2041694 | 11/1992 | Canada | 47/23 |
| 82449 | 12/1894 | German Dem. Rep. | 47/30 |
| 65697 | 11/1969 | German Dem. Rep. | 47/23 |
| 3715632 | 10/1987 | Germany | 47/23 |

*Primary Examiner*—Michael J. Carone
*Assistant Examiner*—Joanne C. Downs

[57] ABSTRACT

A tree trunk shielding device including a cover member. The cover member has a first end edge, a second end edge and a pair of side edges. The cover member has a plurality of alternating folds between the pair of side edges and extending a width of the cover member. Eight rod channels are proportionately spaced between the alternating folds of the cover member. A plurality of snap fastener assemblies are attached to the cover member for securing the cover member around a bottom of a tree trunk. Lastly, eight rod members are positioned through one of the rod channels of the cover member and within the ground when the cover member is secured around the bottom of the tree trunk.

1 Claim, 3 Drawing Sheets

TREE TRUNK SHIELDING DEVICE

BACKGROUND OF THE INVENTION

1. Field of the Invention

The present invention relates to a tree trunk shielding device and more particularly pertains to providing a protective wrap for the bottom of a tree trunk and a shield against tree damage from yard trimming tools.

2. Description of the Prior Art

The use of Tree bark protector is known in the prior art. More specifically, Tree bark protectors heretofore devised and utilized for the purpose of protecting the trunks of trees are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,323,566 to Mills discloses a plant protector apparatus and method. U.S. Pat. No. 5,263,278 to Valenti discloses a plant stem protector apparatus. U.S. Pat. No. 5,048,229 to Campbell discloses a tree trunk protector. U.S. Pat. No. Des. 298,998 to Hurlstone discloses a tree trunk guard. U.S. Pat. No. 4,700,507 to Allen discloses a tree bark protector. Lastly, U.S. Pat. No. 4,268,992 to Scharf discloses a tree protector.

In this respect, the tree trunk shielding device according to the present invention substantially departs from the conventional concepts and designs of the prior art, and in so doing provides an apparatus primarily developed for the purpose of providing a protective wrap for the bottom of a tree trunk and a shield against tree damage from yard trimming tools.

Therefore, it can be appreciated that there exists a continuing need for a new and improved tree trunk shielding device which can be used for providing a protective wrap for the bottom of a tree trunk and a shield against tree damage from yard trimming tools. In this regard, the present invention substantially fulfills this need.

SUMMARY OF THE INVENTION

In view of the foregoing disadvantages inherent in the known types of tree bark protectors now present in the prior art, the present invention provides an improved tree trunk shielding device. As such, the general purpose of the present invention, which will be described subsequently in greater detail, is to provide a new and improved tree trunk shielding device which has all the advantages of the prior art and none of the disadvantages.

To attain this, the present invention essentially comprises a cover member that has a first end edge, a second end edge and a pair of side edges. The cover member has a plurality of openings proportionately spaced about the cover member. The cover member has a plurality of alternating folds between the pair of side edges and extending a width of the cover member. The alternating folds give the cover member an accordion-like body. At least eight rod channels are proportionately spaced between the alternating folds of the body of the cover member. A plurality of snap fastener assemblies are attached to the cover member. Each of the plurality of snap fastener assemblies is formed by a post member and a receiving hole. Each post member of the plurality of snap fastener assemblies is spaced from one of the pair of side edges of the cover member. Each receiving hole of the plurality of snap fastener assemblies is spaced from the other of the pair of side edges of the cover member. Each post member engages a complementary receiving hole for securing the cover member around a bottom of a tree trunk. Lastly, at least eight rod members are provided. Each rod member has a tapered end and a flat head. The flat head is disc-like and extends away from the periphery of the rod member. Each of the rod members is positioned through one of the rod channels of the cover member. The eight rod members, having each one positioned through one of the rod channels and being positioned within the ground when the cover member is secured around the bottom of the tree trunk. The eight rod members, when positioned in the cover member and secured in the ground, retain the position of the cover member that is secured around the bottom of the tree trunk.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tree trunk shielding device which has all the advantages of the prior art Tree bark protectors and none of the disadvantages.

It is another object of the present invention to provide a new and improved tree trunk shielding device which may be easily and efficiently manufactured and marketed.

It is a further object of the present invention to provide a new and improved tree trunk shielding device which is of a durable and reliable construction.

An even further object of the present invention is to provide a new and improved tree trunk shielding device which is susceptible of a low cost of manufacture with regard to both materials and labor, and which accordingly is then susceptible of low prices of sale to the consuming public, thereby making such tree trunk shielding device economically available to the buying public.

Still yet another object of the present invention is to provide a new and improved tree trunk shielding device which provides in the apparatuses and methods of the prior art some of the advantages thereof, while simultaneously overcoming some of the disadvantages normally associated therewith.

Still another object of the present invention is to provide a protective wrap for the bottom of a tree trunk and a shield against tree damage from yard trimming tools.

Lastly, it is an object of the present invention to provide a new and improved tree trunk shielding device. The tree trunk shielding device has a cover member. The cover member has a first end edge, a second end edge and a pair of side edges. The cover member has a plurality of alternating folds between the pair of side edges and extending a width of the cover member. Eight rod channels are proportionately spaced between the alternating folds of the cover member. A plurality of snap fastener assemblies are attached to the cover member for securing the cover member around a bottom of a tree trunk. Lastly, the eight rod members are positioned through one of the rod channels of the cover member and within the ground when the cover member is secured around the bottom of the tree trunk.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
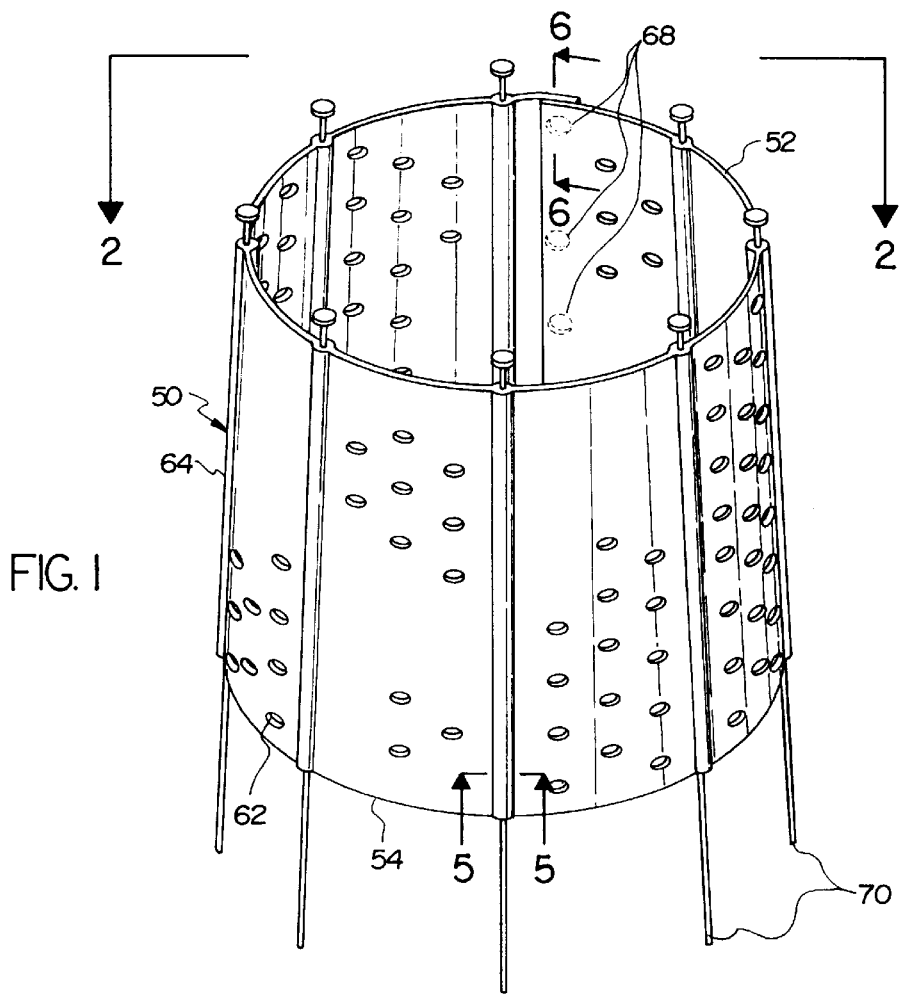
FIG. 1 is a perspective illustration of the embodiment of the tree trunk shielding device constructed in accordance with the principles of the present invention.

With reference now to the drawings, and in particular to FIG. 1 thereof, a new and improved tree trunk shielding device embodying the principles and concepts of the present invention and generally designated by the reference numerals 10 and 50 will be described.

The present invention, the new and improved tree trunk shielding device, is comprised of a plurality of components. Such components in their broadest context include a cover member, snap fastener assemblies and rods. Such components are individually configured and correlated with respect to each other so as to attain the desired objective.

Figure 4:
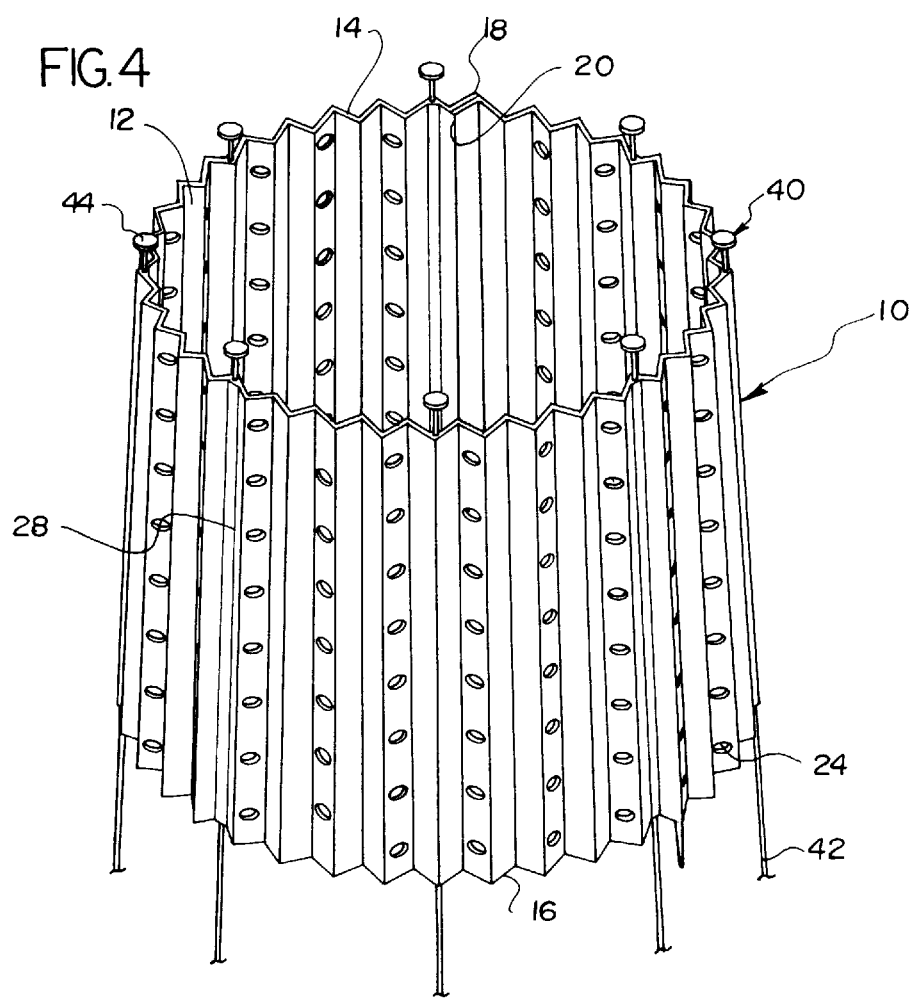
FIG. 4 is a perspective illustration of the preferred embodiment of the tree trunk shielding device with an accordion-like body and constructed in accordance with the principles of the present invention
Figure 5:
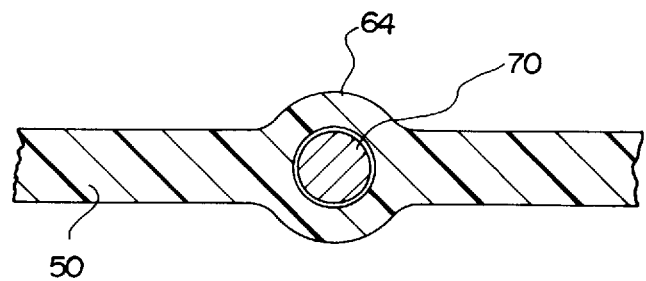
FIG. 5 is cross-sectional view of the rod channel and rod member taken along FIG. 5—5 of FIG. 1.

More specifically, it will be noted that the present invention tree trunk shielding device has two embodiments. The first embodiment has a cover member 12. As shown in FIG. 4, the cover member has a first end edge 14, a second end edge 16 and a pair of side edges 18 and 20. The cover member has a plurality of openings 24 proportionately spaced about the cover member. Each opening has a diameter of ³⁄₁₆ inch. The cover member has a plurality of alternating folds 26 between the pair of side edges. The alternating folds extend vertically along a width of the cover member. The alternating folds give the cover member an accordion-like body. The accordion-like body allows the cover member to have more flexibility and versatility. At least eight rod channels 28 are proportionately spaced between the alternating folds of the body of the cover member. Each of the eight rods channels extend parallel to a pair of complementary folds of the cover member.

Figure 3:
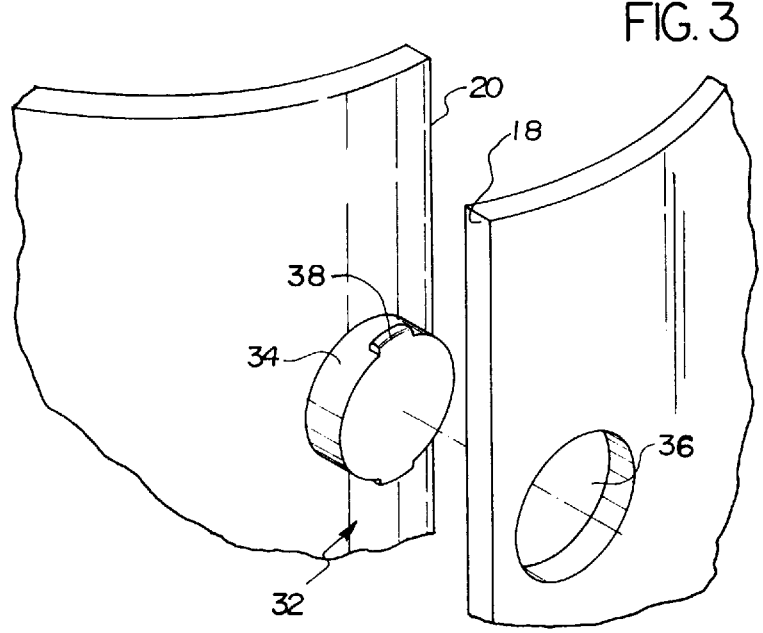
FIG. 3 is an enlarged exploded view of the snap fastener assembly of the present invention.
Figure 6:
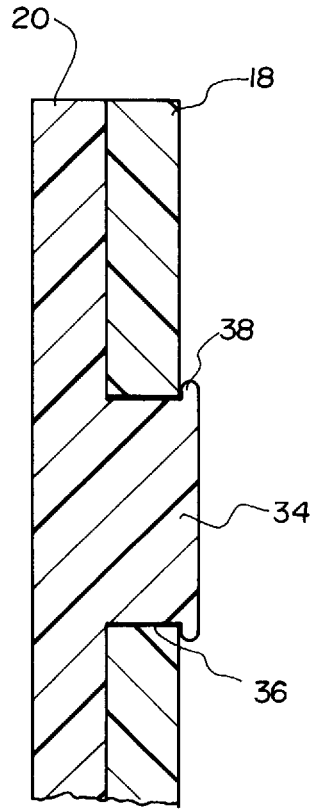
FIG. 6 is a cross-sectional view of the coupling of the post member and receiving hole taken along FIG. 6—6 of FIG. 1.

Also, a plurality of snap fastener assemblies 32 are provided and attached to the cover member 12. Each of the plurality of snap fastener assemblies is formed by a post member 34 and a receiving hole 36, as shown in FIG. 3. Each post member has a generally cylindrical form with a pair of nodules 38. The pair of nodules project from symmetrically opposite side of a top portion of each post member. The pair of nodules are relatively flexible and bend as the post member is positioned into the receiving hole. FIG. 6 shows the coupling between one of the post members and one of the receiving holes of the snap fastener assemblies.

Additionally, each post member 34 of the plurality of snap fastener assemblies is spaced from one 18 of the pair of side edges of the cover member, as shown in FIG. 3. Each receiving hole 36 of the plurality of snap fastener assemblies is spaced from the other of the pair of side edges of the cover member. Each post member will engage a complementary receiving hole for securing the cover member around a bottom of a tree trunk. The coupling between the post member and the receiving hole occurs by over lapping the pair of side edges of the cover member. The one pair of side edges, that have the post members, is over lapped by the other of the pair of side edges, that has the receiving holes.

As illustrated in FIG. 4, at least eight rod members 40 are included. Each rod member has a tapered end 42 and a flat head 44. Each flat head extends away from the periphery of the rod member and has a diameter greater than the diameter of he rod member. Each of the rod members is positioning through one of the rod channels of the cover member, as shown in FIG. 4. The disc-like shape of the flat head enables the rod member to remain in the rod channel and not be pushed out through the second end 16. Each one of the eight rod members is positioned through one of the rod channels and positioned within the ground when the cover member is secured around the bottom of the tree trunk. The eight rod members, when positioned in the cover member and secured in the ground, help to retain the position of the cover member when it is secured around the bottom of the tree trunk.

Furthermore, the second embodiment of the present invention has a semi-rigid cover member 50. This cover member has a first end edge 52, a second end edge 54 and a pair of side edges 56 and 58. The cover member has a plurality of openings 62 that are proportionately spaced about the cover member. These opening are ³⁄₁₆ inch in diameter. The cover member, as shown in FIG. 1, has eight rod channels 64 that are proportionately spaced. Each rod channel extends vertically along the width of the cover member and extending between the first end edge and the second end edge. In this embodiment each of the rod channels project away form the surface of the cover member.

Figure 2:
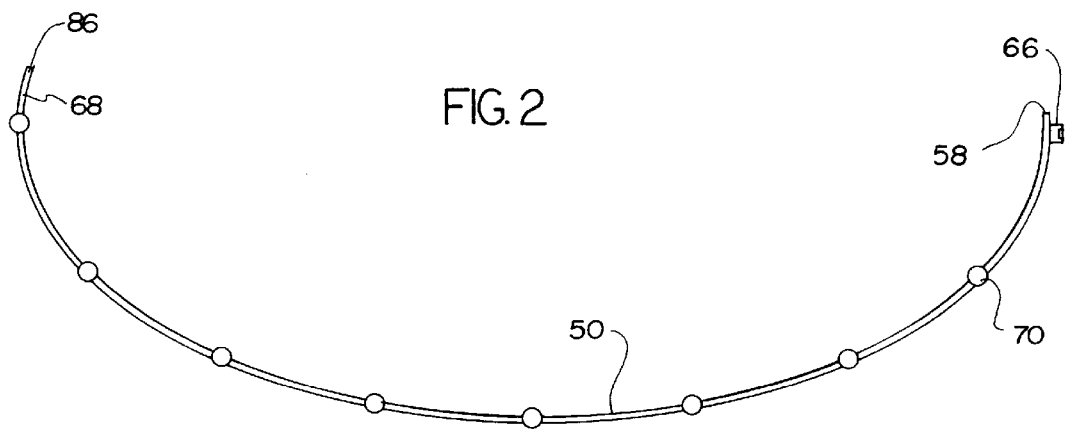
FIG. 2 is a top plan view of the tree trunk shielding device of FIG. 1 in an open orientation.

As shown in FIG. 2, the cover member can be expanded to have an almost linear appearance.

A plurality of snap fastener assemblies are attached to the cover member. The snap fastener assemblies will secure the cover member around a bottom of a tree trunk. As shown in FIG. 2, each of the plurality of snap fastener assemblies is formed by a post member 66 and a recess 68. Each post member of each of the plurality of snap fastener assemblies is capable of engaging a complementary recess for securing the cover member around a bottom of a tree trunk.

Finally, eight rod members 70 are positioned through one of the rod channels 64 of the cover member. Once the rods are placed in the rod channel, they are positioned within the ground when the cover member being secured around the bottom of the tree trunk. The rod members of the second embodiment 50 are identical to the rod members 40 of the first embodiment 10.

The present invention tree trunk shielding device is structured for instillation around the bottom of tree trunks, shrubs, mailbox post, etc. The present invention prevents damage caused by lawn mowers and weed trimmers. The present invention has two embodiments, the first embodiments features an accordion-like body. This embodiment provides greater flexibility and has the ability to expand or contract around trees of varying sizes. The second embodiment has a smooth body. Both embodiments have a plurality of openings and a plurality of snap fastener assemblies attached. The openings operate as air holes that allow the tree to breath when the present invention is left around the tree trunk for a long period of time. Also, each embodiment can be manufactured with a plastic material that will glow-in-the-dark and have neon colors.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

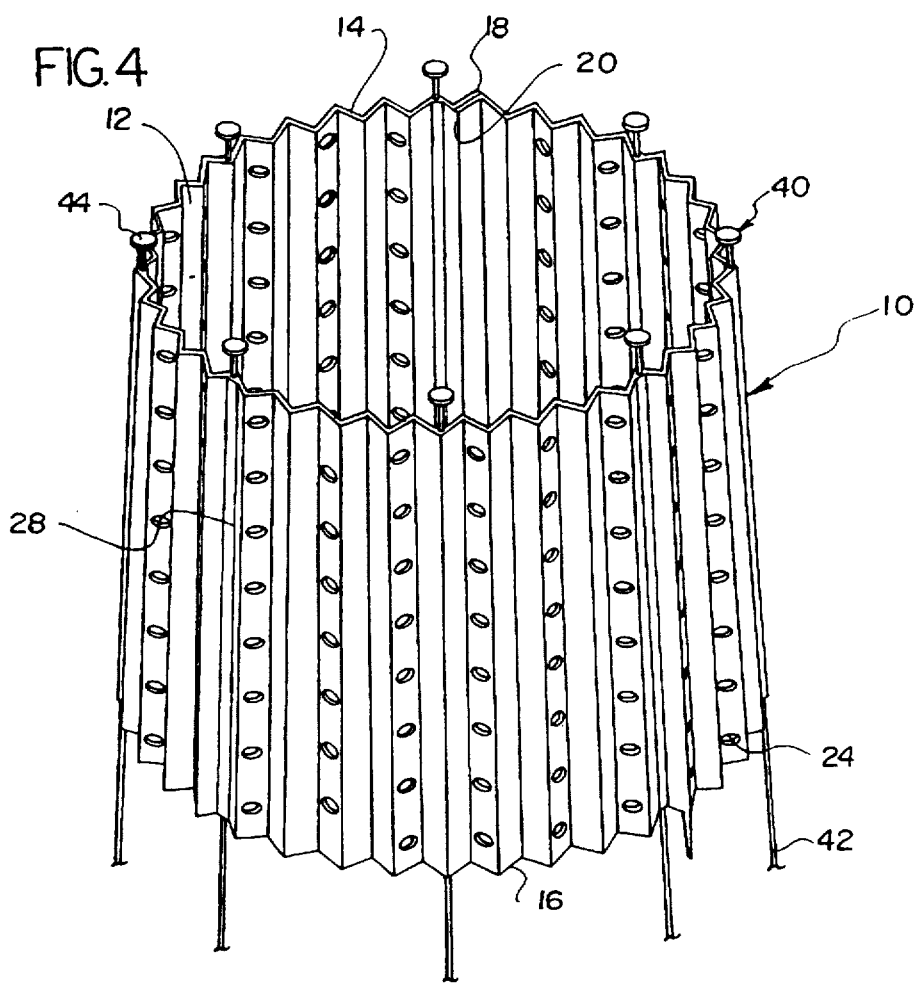

What is claimed as being new and desired to be protected by Letters Patent of the United States is as follows:

1. A new and improved tree trunk shielding device for protecting the bottom of a tree comprising in combination:

a cover member having a first end edge, a second end edge and a pair of side edges therebetween, the cover member having a plurality of openings proportionately spaced about the cover member, the cover member having a plurality of alternating folds between the pair of side edges and extending a width of the cover member, the alternating folds giving the cover member an accordion-like body, at least eight rod channels being proportionately spaced between the alternating folds of the body of the cover member, each of the eight rod channels extending parallel to a pair of complementary folds of the cover member;

a plurality of snap fastener assemblies being attached to the cover member, each of the plurality of snap fastener assemblies being formed by a post member and a receiving hole, each post member having a generally cylindrical form with a pair of nodules projecting therefrom, the pair of nodules being symmetrically positioned about the post member, each post member of the plurality of snap fastener assemblies being spaced from one of the pair of side edges of the cover member, each receiving hole of the plurality of snap fastener assemblies being spaced from the other of the pair of side edges of the cover member, each post member engaging a complementary receiving hole for securing the cover member around a bottom of a tree trunk; and at least eight rod members with each rod member having a tapered end and a flat head, the flat head being disc-like and extending away from the periphery of the rod member, each one of the eight rod members being positioned through one of the rod channels of the cover member and being positioned within the ground, such that when the cover member is secured around the bottom of the tree trunk, the eight rod members, when positioned in the cover member and secured in the ground, retain the position of the cover member when secured around the bottom of the tree trunk.

* * * * *

UNITED STATES PATENT AND TRADEMARK OFFICE
CERTIFICATE OF CORRECTION

PATENT NO.    : 5,809,689
DATED         : September 22, 1998
INVENTOR(S)   : Shashi R. Mathur

Page 1 of 2

It is certified that error appears in the above-identified patent and that said Letters Patent is hereby corrected as shown below:

The title page, showing the illustrative figure, should be deleted and substitute therefor the attached title page.

Signed and Sealed this

Twenty-fifth Day of May, 1999

Attest:

Q. TODD DICKINSON

*Attesting Officer*    *Acting Commissioner of Patents and Trademarks*

United States Patent [19]

Mathur

[11] Patent Number: 5,809,689
[45] Date of Patent: Sep. 22, 1998

[54] TREE TRUNK SHIELDING DEVICE

[76] Inventor: Shashi R. Mathur, 4838 Rhea Rd., Witchita Falls, Tex. 76308

[21] Appl. No.: 872,924

[22] Filed: Jun. 11, 1997

[51] Int. Cl.$^6$ .......................... A01G 13/10; A01G 17/00
[52] U.S. Cl. ........................................................ 47/23; 47/30
[58] Field of Search .................................. 47/23, 30, 26, 47/21

[56] References Cited

U.S. PATENT DOCUMENTS

| 223,093 | 12/1879 | Barnhill et al. | 47/23 |
| 5,016,388 | 5/1991 | Burress et al. | 47/23 |
| 5,060,416 | 10/1991 | Rohde | 47/23 |
| 5,263,278 | 11/1993 | Valenti, Jr. | 47/30 |

FOREIGN PATENT DOCUMENTS

| 2041694 | 11/1992 | Canada | 47/23 |
| 82449 | 12/1894 | German Dem. Rep. | 47/30 |
| 65697 | 11/1969 | German Dem. Rep. | 47/23 |
| 3715632 | 10/1987 | Germany | 47/23 |

*Primary Examiner*—Michael J. Carone
*Assistant Examiner*—Joanne C. Downs

[57] ABSTRACT

A tree trunk shielding device including a cover member. The cover member has a first end edge, a second end edge and a pair of side edges. The cover member has a plurality of alternating folds between the pair of side edges and extending a width of the cover member. Eight rod channels are proportionately spaced between the alternating folds of the cover member. A plurality of snap fastener assemblies are attached to the cover member for securing the cover member around a bottom of a tree trunk. Lastly, eight rod members are positioned through one of the rod channels of the cover member and within the ground when the cover member is secured around the bottom of the tree trunk.

1 Claim, 3 Drawing Sheets